US007510622B2

(12) United States Patent
Kalkanoglu et al.

(10) Patent No.: US 7,510,622 B2
(45) Date of Patent: Mar. 31, 2009

(54) METHOD OF MAKING A SHINGLE AND SHINGLE MADE THEREBY

(75) Inventors: Husnu M. Kalkanoglu, Swarthmore, PA (US); Robert L. Jenkins, Honey Brook, PA (US); Richard Krause, Collegeville, PA (US); Joseph Quaranta, Yardley, PA (US); Kermit Stahl, North Wales, PA (US)

(73) Assignee: CertainTeed Corporation, Valley Forge, PA (US)

( * ) Notice: Subject to any disclaimer, the term of this patent is extended or adjusted under 35 U.S.C. 154(b) by 457 days.

(21) Appl. No.: 10/544,567

(22) PCT Filed: May 9, 2005

(86) PCT No.: PCT/US2005/016063

§ 371 (c)(1),
(2), (4) Date: Aug. 19, 2005

(87) PCT Pub. No.: WO2006/121433

PCT Pub. Date: Nov. 16, 2006

(65) Prior Publication Data

US 2006/0260731 A1 Nov. 23, 2006

(51) Int. Cl.
*B29C 65/48* (2006.01)
*B32B 37/02* (2006.01)
*B32B 37/24* (2006.01)
*B32B 27/04* (2006.01)

(52) U.S. Cl. ........................ 156/278; 156/279; 156/289

(58) Field of Classification Search .................. 156/64, 156/250, 252, 268, 269, 277, 278, 279, 289, 156/307.1, 307.3, 307.7; 52/518; 83/920; 427/186, 187, 188
See application file for complete search history.

(56) References Cited

U.S. PATENT DOCUMENTS

| | | | | |
|---|---|---|---|---|
| 2,158,357 | A | 5/1939 | Eckert | |
| 4,352,837 | A * | 10/1982 | Kopenhaver | 427/187 |
| 4,523,543 | A | 6/1985 | Brady et al. | |
| 5,095,219 | A * | 3/1992 | Laumann et al. | 250/548 |
| 5,102,487 | A | 4/1992 | Lamb | |
| 5,186,980 | A | 2/1993 | Koschitzky | |
| 5,494,728 | A * | 2/1996 | Vermilion et al. | 428/143 |
| 5,624,522 | A * | 4/1997 | Belt et al. | 156/279 |
| 5,951,809 | A * | 9/1999 | Jenkins et al. | 156/277 |
| 6,010,589 | A * | 1/2000 | Stahl et al. | 156/260 |
| 6,174,403 | B1 | 1/2001 | Steiner et al. | |
| 6,212,843 | B1 | 4/2001 | Kalkanoglu et al. | |
| 6,220,329 | B1 * | 4/2001 | King et al. | 156/512 |
| 6,355,132 | B1 * | 3/2002 | Becker et al. | 156/260 |
| 6,360,638 | B1 * | 3/2002 | White et al. | 83/13 |
| 6,467,235 | B2 | 10/2002 | Kalkanoglu et al. | |
| 6,487,828 | B1 * | 12/2002 | Phillips | 52/554 |

(Continued)

*Primary Examiner*—Philip C Tucker
*Assistant Examiner*—Sing P Chan
(74) *Attorney, Agent, or Firm*—Paul & Paul

(57) ABSTRACT

A method of making a shingle and the shingle made in accordance with such method are provided, in which a shingle-forming layer of shingle material has a plurality of marks applied thereto prior to or after application of decorative granules to its tab region, and wherein the locations of the marks are sensed by a sensor, that then activates and controls the operation and placement of various shingle-completion steps as a function of the placement of the marks.

22 Claims, 7 Drawing Sheets

U.S. PATENT DOCUMENTS

| | | | | |
|---|---|---|---|---|
| 6,635,140 | B2 * | 10/2003 | Phillips et al. | 156/259 |
| 2002/0088324 | A1 | 7/2002 | White et al. | |
| 2002/0092596 | A1 | 7/2002 | Phillips et al. | |
| 2003/0108662 | A1 * | 6/2003 | Rodenbaugh et al. | 427/8 |
| 2004/0079042 | A1 | 4/2004 | Elliott | |

* cited by examiner

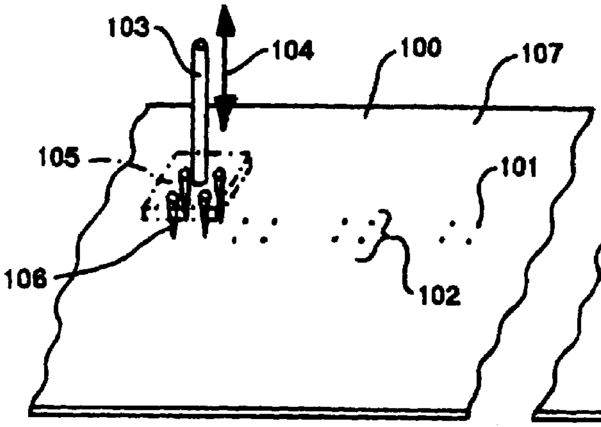
Fig. 2
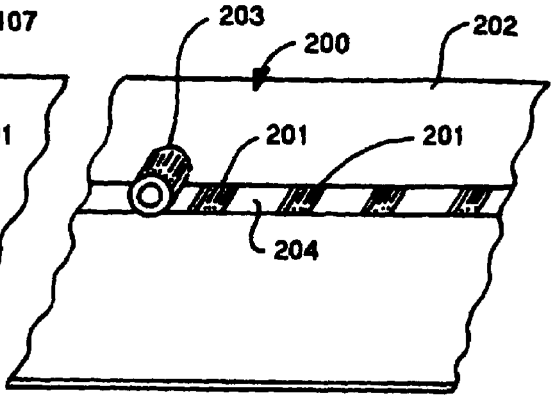
Fig. 3
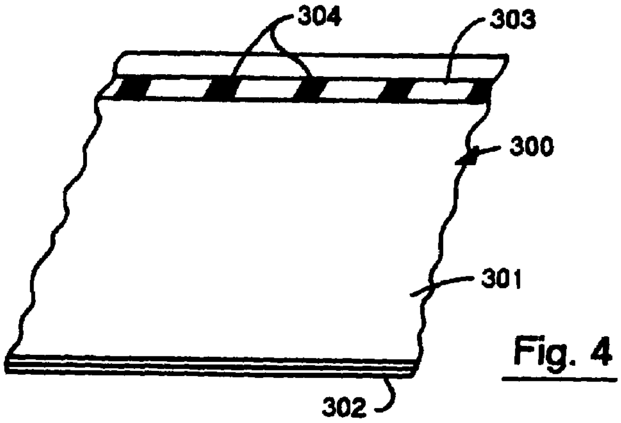
Fig. 4
Fig. 5
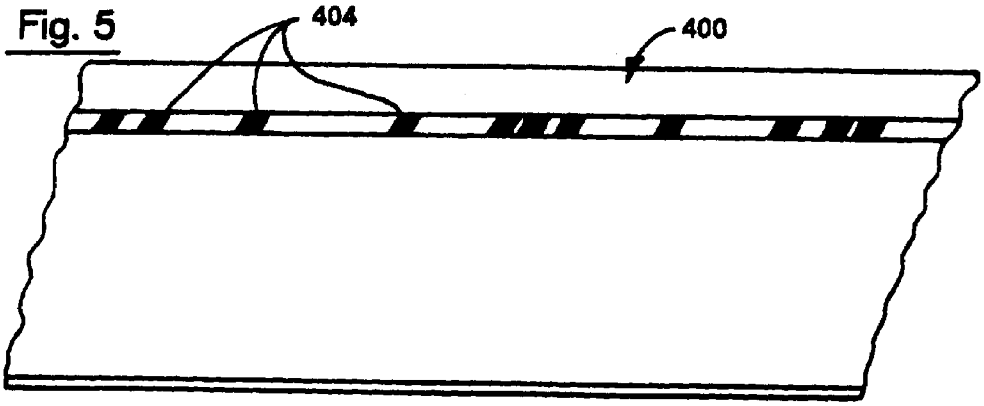

METHOD OF MAKING A SHINGLE AND SHINGLE MADE THEREBY

BACKGROUND OF THE INVENTION

Endeavors have been made for many years to manufacture asphalt shingles having appearances of natural materials, such as slate, tile, and cedar shakes.

In the course of manufacture of such shingles, it is known to use a mat, generally of fiberglass construction, impregnated with an asphalt or other bitumen material, and then to apply granules to the shingle, to adhere to the bitumen material.

When shingles are to be laid-up on a roof, with each successive course overlying in part, an underlying course of shingles, it is generally not considered necessary that the same granules be applied both to the butt (or headlap) region of the shingle as will be applied to the tab region of the shingle, because the butt region of the shingle will be covered by one or more next-overlying shingles, whereas the tab region of a shingle will remain visible.

Consequently, when decorative granules are to be applied to a shingle, they are generally only applied to a tab region, because that is the region of the shingle that will be visible when the shingle is laid-up on a roof.

Various techniques have been developed for making the tab regions of shingles decorative, often to resemble natural materials, as mentioned above.

Often, different decorative effects are sought to be applied to different tabs of the same multi-tab manufactured shingle, such that each tab can simulate an individual tile, piece of slate, cedar shake, etc.

SUMMARY OF THE INVENTION

The present invention is directed to creating decorative manufactured shingles, wherein various decorative effects, such as decorative granule application, slot or other space in between adjacent tabs, shingle cut-off between adjacent shingles, and shingle expansion/contraction, or any of the above functions can be controlled with great precision, by first marking the layer of shingle-forming material, prior to, during or after doing any of the decorative granule application, slot or spacing formation, or cut-off functions, and then sensing the mark(s) and then controlling with precision the placement of such subsequent functions, in an automatic manner, such that the desired shingle is manufactured with precision. That is, some operations to produce a shingle could already have occurred prior to marking the shingle-forming material to control other, subsequent operations in the manufacture of the shingle.

The markings can be uniformly spaced apart, to create a predetermined repeatability of features in the shingles, or they can be unevenly spaced apart to provide a predetermined appearance of non-repeatability, as desired, for example by printing or marking on a portion of the moving web or shingle-forming layer, or having a coating or tape applied to the shingle-forming layer with a printer, such as an inkjet printer online, or by any other means.

The markings can be provided in any of a number of manners, such as by applying a tape to the shingle-forming layer early in its manufacture, by applying a barcode to the shingle-forming layer, directly or via a tape, by applying holes (which include punctures or notches), or any other form of marking as may be desired.

Accordingly, it is an object of this invention to provide a novel method of manufacturing a shingle, wherein various decorative effects can be achieved with precision, by controlling the exact application of such decorative effects by sensing a predetermined mark on a shingle-forming layer, prior to application of decorative effects.

It is another object to accomplish the above object, wherein one such decorative effect is the application of decorative granules in the tab region of the shingle-forming layer.

It is another object of this invention to accomplish the above objects wherein the decorative effects include cutting slots or other spaces in the tab region of the shingle-forming layer to form spaced-apart tabs.

It is a further object of this invention to accomplish the above objects, wherein one such decorative effect is the cutting of the shingle-forming layer into separate shingles of predetermined length.

It is yet another object of this invention to accomplish the above objects, wherein one such decorative effect is controlling the expansion and/or contraction of the shingle-forming layer prior to cutting the shingle-forming layer into separate shingles, by controlling the humidity in the shingle manufacturing environment. Such is desirable for dimensional stability of a paper or polymer based or tape appliqué bearing a marking scheme prior to application to the shingle-forming layer.

Other objects and advantages of the present invention will be readily apparent to those skilled in the art upon a reading of the following brief descriptions of the drawing figures, the detailed descriptions of the preferred embodiments, and the appended claims.

BRIEF DESCRIPTIONS OF THE DRAWING FIGURES

FIG. 1 is a top perspective view of a schematic illustration of the manufacture of shingles by the application of various decorative effects to a shingle-forming layer as it is being conveyed along a longitudinal path, and wherein marks are applied to the shingle-forming layer prior to application of decorative effects thereto, such marks being applied to the shingle-forming layer in the form of a tape that is applied thereto.

FIG. 2 is a top perspective view, fragmentally illustrating a portion of a shingle-forming layer having sensible marks applied thereto in the form of holes or punctures.

FIG. 3 is an illustration similar to that of FIG. 2, but wherein barcode(s) are applied to the shingle-forming layer, to comprise the marks.

FIG. 4 is an illustration similar to that of FIGS. 2 and 3, but wherein a tape having marks thereon similar to those of FIG. 1 is applied to the shingle-forming layer, and wherein the shingle that is made is a multi-layer shingle.

FIG. 5 is an illustration similar to that of FIGS. 2 and 3, but wherein the marks are applied in the form of a tape, and which are seemingly randomly disposed on the tape, to yield an appearance of non-repeatability of features in the completed shingle.

DETAILED DESCRIPTIONS OF THE PREFERRED EMBODIMENTS

Figure 1:
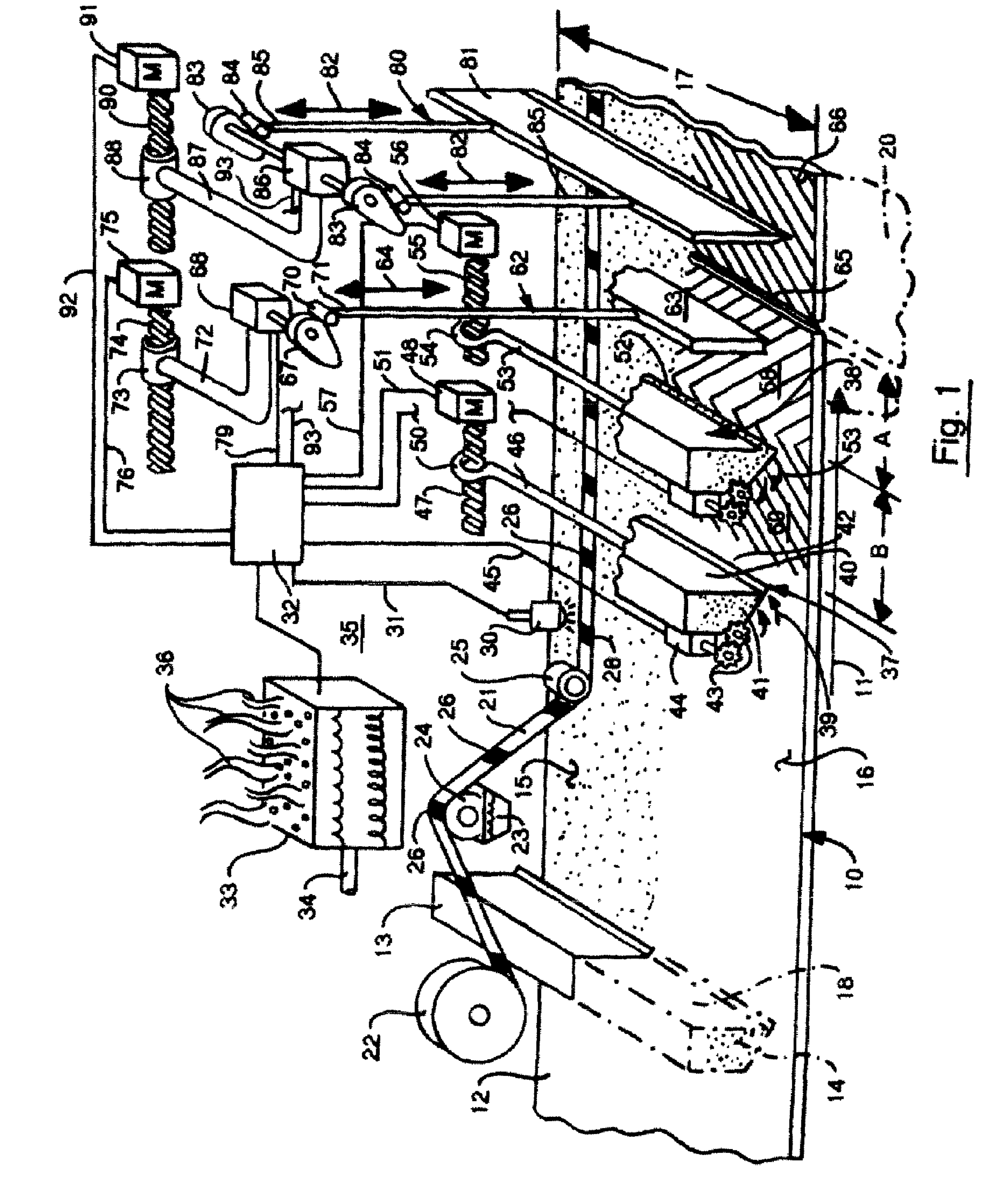
FIG. 1A is a diagrammatic illustration of the placement of a sensor relative to the shingle-forming layer after application of the marking feature, with the mark position being responsive to something that has already occurred, for triggering or controlling subsequent events.

Referring now to the drawings in detail, reference is first made to FIG. 1, wherein a shingle-forming layer 10 is generally illustrated as being conveyed from left to right, in the longitudinal direction of the arrow 11. It will be understood that the shingle-forming layer is being conveyed on a conveyor, generally of the roller type (not shown), and that the layer 10 is fragmentally illustrated. The layer 10 is comprised of a base mat of reinforcement material, preferably fiberglass, although the same can be an organic material, and wherein the reinforcement material is already impregnated with an asphalt or other bitumen material.

The bitumen material also appears on the surface 12, to receive granules dispensed therefrom from a granule applicator 13. The granule applicator 13 has granules 14 therein which will normally dispense lower grade granules, that can be reclaimed granules (also called headlap granules) therefrom, into a butt or headlap region 15 of the shingle-forming layer, which region 15 is above a tab region 16 of the shingle-forming layer, as shown in FIG. 1.

Generally, the granules 14 dispensed from the granule dispenser or applicator 13 are dark in color, although they can, if desired, be of any other shade.

Because the granules dispensed from the applicator 13 are principally dispensed into the butt or headlap region 15, the applicator 13 need not be of the full width 17 of the shingle-forming layer, although, if desired, the applicator 13 can be of full width as shown by the phantom extension portion 18 thereof, if it is desired to initially, or at any other time, dispense headlap granules also into the tab region of the shingle-forming layer 12.

It will be understood that, in the manufacture of a shingle-forming layer 12 in accordance with this invention, the shingle-forming layer may be manufactured in the form of a pair of side-by-side shingle-forming layer portions 12 and 20, with the portion 20 being fragmentally shown in phantom in FIG. 1, such that the layer portions 12 and 20 are simultaneously formed, in accordance with that portion of the disclosure of parallel shingle-forming layers as manufactured according to U.S. Pat. No. 6,212,843, the complete disclosure of which is herein incorporated by reference.

For the purposes of simplifying the presentation of the invention in accordance with this application, hereafter, only a single shingle-forming layer 12 will be discussed.

It will also be understood that it is not essential that headlap granules 14 be applied at all, in accordance with this invention, prior to the application of decorative granules as will hereinafter be discussed, and prior to the application of slots and shingle cut-off, although the application of headlap granules 14 in the headlap or butt region 15 of the shingle is preferred.

Marks are applied to the shingle-forming layer 12, preferably in the butt region 15, and such marks may be applied by applying a tape 21, supplied from a roll 22 or the like, which tape becomes attached to a preferably upper surface of the shingle-forming layer 12 by means of an adhesive 23 applied from an adhesive applicator 24 of a roller or like type, as shown in FIG. 1, such that the lower surface of the tape adhesively sticks to the upper surface of the tab portion 15 of the shingle-layer 12, and preferably onto headlap granules that are applied in the butt region 15 of the shingle-forming layer 12.

A roller 25 or the like can urge the tape 21 into contact with the upper surface of the butt region 15 of the shingle-forming layer 12, as shown.

The tape 21 has a pluarity of marks 26 thereon, which, in the embodiment shown in FIG. 1, can be darkened areas of the tape 21, which can be evenly spaced apart as shown to provide a predetermined repeatability of features of other shingle-completion steps that will subsequently be discussed, or which darkened areas 26 may, if desired, be unevenly spaced apart from each other to provide a predetermined non-repeatability of features of shingle-completion steps that will subsequently be discussed.

A sensor 30 is provided, for sensing the presence of marks 26 passing therebeneath and communicating, in response thereto, via a signal line 31, to a computer or other controller 32, preferably of the microprocessor type. In the case of a wireless transmission of the signal from the sensor 30 to the controller 32, a physical signal line 31 would not be necessary.

It will be understand that the sensor 30 may take on various forms, such as a lightness or darkness detector, a metal or magnetic detection device, a barcode reader, an infrared detection device, a hole detection device, a photocell, a CCD array image reader or any other form of detection device, many types of which are well known in the art, which can detect some difference caused by a mark of various types such as that 26, passing therebeneath.

Once the sensor 30 detects the presence of a mark 26 passing therebeneath, it can then control the application of various other shingle-completion features, which control is exercised subsequently to the sensing of marks 26 by the sensor 30.

One such feature that can be controlled is the humidity environment in which the shingle-forming layer 12 continues to pass in the direction of the arrow 11. To this end, the controller 32 is operatively connected to a humidifier 33, supplied with water via a line 34, in the manufacturing environment 35 in which the shingles are being made, such that moisture 36, provided from the humidifier 33 is added to the environment 35 in amounts as determined by the controller 32. By proper control of the humidity in the environment 35, any expansion and/or contraction of the layer 12 as shingles are being formed therefrom can be controlled with precision. Humidity control facilitates dimensional stability of the marking tape 21, as well.

In FIG. 1 there are also shown a pair of decorative granule applicator systems 37 and 38. While only two such systems 37 and 38 are shown, it will be apparent that any desired number of such systems may be used, in accordance with the present invention.

The applicator system 37 includes a decorative granule applicator 40 fragmentally illustrated, having granules 41 therein, with an openable bottom 42 controlled in some manner within the skill of those in this art, but shown closed in the direction of arrows 39. In the particular embodiment shown, the openable bottom 42 is shown as being controlled by a pair of gears 43 controlled by a gear box 44, that, in turn, is electrically controlled via control line 45 from the controller 32. It will be apparent that other forms of granule application may be utilized other than that shown for the system 37, and that the discharge from openable bottom 42 may be replaced by any other means of discharge. Similarly, the gearing and gear box 43, 44, respectively represents only one representative means of controlling the application of granules from the applicator system 37.

Thus, the dropping of decorative granules 41 is controlled from the controller 32, that in turn responds to the sensor 30 detecting marks such as those 26.

The decorative granule applicator 37 is also controlled as to its longitudinal position leftward or rightward, in order to control the precise placement of dropping of granules therefrom onto the upper surface of the shingle-forming layer 12. Thus, variations leftward and rightward in the positioning of the applicator 40 can take place in that the applicator 40 is connected via positioning rod 46 to a means for moving the applicator 40 leftward and rightward. One such means can be the use of a worm gear 47, rotatable as determined by a motor 48 that controls the rotation of the worm screw, and by which a bearing 50 that rides along the worm gear 47 is moved leftward and rightward upon rotation of the motor 48, and with the rotation of the motor 48 being controlled via control line 51 from the controller 32, which, again, is, in turn, responsive to the detection of marks 26 by the sensor 30.

The decorative granule system 38, likewise is adapted for dropping decorative granules on the upper surface of the shingle-forming layer 12, by opening openable bottom 52 in the direction of the arrows 53.

In a similar manner to the system 37, the system 38 is operated via a positioning rod 53, a bearing 54, a worm gear 55, motor 56, control line 57, and the controller 32 upon sensing of marks 26 by the sensor 30.

It will thus be seen that the granule applicator systems 37 and 38 are shown to have accurately deposited granules of different decorative appearances that start and stop as viewed longitudinally, with precision, as shown by the dimensions A and B for the tab-forming zones 58 and 60, respectively.

The manner in which the sensor 30, by sensing marks 26 and operating to control the cutting of slots or other spaces in the tab region 16 of the shingle-forming layer 12, to form spaced-apart tabs will now be discussed. The slot or other space-forming system 62 comprises a slot or space cutter 63, positionable into and out of contact with the shingle-forming layer 12, and positionable longitudinally for precise placement of the slot or other space that is to be cut. In the embodiment shown, the cutter 63 is adapted to be moved upwardly or downwardly in the direction of the double-headed arrow 64, to form the slot 65 or other space between tab zones 58 and 66 in FIG. 1. One mechanism for moving the cutter 63 to form the slot 65 or other space, is in the form of a cam 67, driven via a drive mechanism 68, controlled via control line 79 from controller 32 and with the cam 67 operating against a cam follower 70 that drives a rod 71 carried thereby upwardly or downwardly, as shown in FIG. 1 to cut a slot 65 or other space between adjacent tabs.

The entire system 62 can also be moved leftwardly or rightwardly as shown in FIG. 1 in that it is mounted to an "L"-shaped bar 72 that, in turn is carried by a bearing 73 that is mounted on a worm gear 74, such that upon rotation of the worm gear 74, the bearing 73 moves the system 62 leftward or rightward, and with the worm gear 74 being controlled by the motor 75 that is connected via control line 76 to the controller 32, such that upon detection of marks 26 by the sensor 30, the system 62 can be placed leftward or rightward, in the precise position desired and can be activated to engage the shingle-forming layer and cut a slot 65 or other space between tab zones to form tabs such as that 65 of FIG. 1.

A system 80 will now be discussed for cutting the shingle-forming layer 12 into discrete shingles. The system 80 as shown in FIG. 1, includes a shingle cutter 81 adapted for movement upwardly or downwardly as shown by the double-headed arrow 82. Such vertical movement can be controlled by a plurality of cams 83 engaged with cam followers 84 that in turn operate drive rods 85 that move the cutter 81 upwardly or downwardly as driven by the cam drive mechanism 86. The drive mechanism 86 is, in turn, controlled for movement of the cutoff system 80 leftwardly or rightwardly in a manner similar to that provided for the system 62, in that an "L"-shaped bar 87 between the cam drive 86 and a bearing 88 mounted on a worm gear 90 is controlled in its leftward and rightward movement by a motor 91 that is connected via line 92 to the controller 32. Thus, upon the sensor 32 sensing marks 26, the longitudinal positioning of the cutter mechanism 80 can be precisely set, and the activation of the cam drive 86 to move the cutter 81 downwardly is controlled from the controller 32 via line 93, again, upon sensing by the sensor 30 of marks 26.

It should be apparent from the above, that only representative mechanisms are discussed for controlling the opening and closing of the decorative granule applicator systems 37 and 38, for controlling the leftward and rightward positioning of the decorative granule applicator systems 37 and 38, for controlling the manner in which the slot or other space cutting system 62 makes cutting contact with the shingle-forming layer 12, for controlling the leftward and rightward positioning of the slot or other space-cutting system 62, for controlling the manner in which the cutter 81 makes contact with the shingle-forming layer for cutting the same into discrete shingles, for controlling the manner in which the shingle cutting system 80 moves leftward or rightward, for proper cut-off placement as determined by the controller 32 and for controlling humidity in the manufacturing environment. As is specifically shown in FIG. 1, representative mechanisms and controlling apparatus are shown. However, it will be understood that in place of the particular systems shown, other systems either electrical and/or mechanical can be utilized. For example, other positioners than worm gears can be used, such as electrically operated solenoids, mechanically or pneumatically operated piston cylinders, or the like. Also, in lieu of the cams and cam followers described above, solenoids, pistons or the like could be used in their places. Also, for purposes of cutting the slots or other spaces between adjacent tabs, and or for use in cutting the shingle-forming layer into discrete shingles, apparatus such as that shown in U.S. Pat. No. 6,212,843 may be used, for cutting slots between tabs, for use as a shingle cut-off, and even for use in severing a pair of shingle-forming layer portions 12 and 20 (as is fragmentarily shown in phantom) in FIG. 1, along a common severance line. Thus, the apparatus as shown in FIG. 1 is merely one representative apparatus for accomplishing the shingle-completion steps in accordance with this invention. For purposes of transmission of signals, for example, for control of various mechanisms and apparatuses in the operation, wireless transmitted signals may provide an alternative to hardwired signal lines. Such signals may be electrical, electronic, optical, electro optic in nature, or of any other form.

There are several advantages to overall shingle design and aesthetics with regard to synchronization of color blend drops to tabs or fixed positions on a shingle and synchronization of shingle length. When cutouts are evenly spaced on a shingle and there is a fixed length it is critical that the synchronized length occur at the correct positioning such as in the middle of a cutout slot to give a balanced or center cut. This is important when applying multiple shingles so that a desired appearance of a uniform and seamless joint is present. Synchronization to the cutout slot position therefore is a critical advantage to a product having two or more layers. The advantage applies to a top layer with side edge cutouts and a bottom layer with a straight cut where the top layer is applied over the bottom layer and then cut to length and position by a synchronization.

Other applications to shingle product design and aesthetics could involve:

(a) petticoat (posterior layer extending below anterior layer) or top to bottom offset between adhered multiple layers including uniform and non-uniform bottom edge cut designs and varying heights of petticoat top to bottom offset and on-off petticoat height variations where a portion of the bottom edge is offset and another adjacent or non-adjacent portion is not offset form the bottom edge of two or more multiple layers;

(b) cutouts could be in non-uniform locations on the top or other layer locations and could be on one or more side edge locations;

(c) shingle lengths could also be of pre-designed lengths that are intended to be variable for a particular aesthetic appearance such as to simulate a wood shake appearance;

(d) cutout widths could vary in width across an individual shingle surface;

(e) cutout widths are thought to have the best aesthetics with uniform cutout widths less than one inch in width;

(f) cutouts could also vary in non-uniform height and could also vary in height when combined with varying widths;

(g) cutouts can also vary in non-uniformity of top to bottom dimension, such as not to be a continuous straight line on one or more sides. The same could hold true for left to right dimensions such as at the top or bottom of a cutout; and/or (h) a slit or slice could also be considered as a cutout.

Figure 1A:
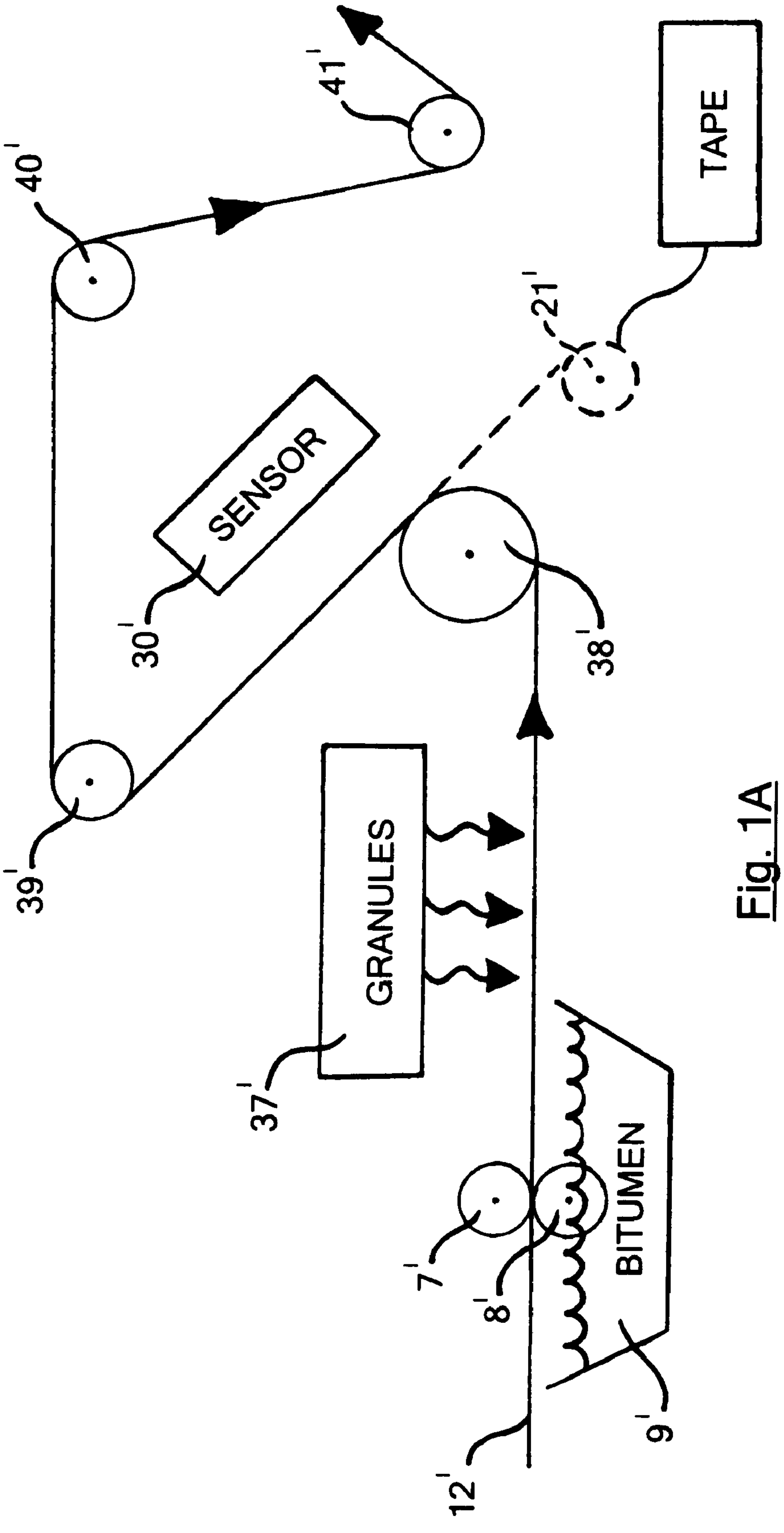

With reference to FIG. 1A, it will be seen that the shingle-forming layer 12' may have granules applied via granule drop 37' after bitumen is applied from tank 9' while the layer 12' passes between rollers 7' and 8', and that after the granules are applied at 37', the shingle-forming layer passes around roller 38', and then the sensor 30' senses a mark that has been applied to the shingle-forming layer 12' after the marking tape 21' is applied subsequent to the granule application at 37'. The mark applied by the marking tape 21' or via some other marking means is thus responsive to something that has already occurred and serves to trigger and/or control subsequent events.

With reference now to FIG. 2, it will be seen that a shingle 100 is fragmentally shown, as having a plurality of holes 101 applied in groupings 102, as shown, by means of a mechanism 103 movable upwardly and downwardly in the direction of the double-headed arrow 104, as shown, by a suitable motor, solenoid or the like (not shown), which in turn carries a base 105 (shown in phantom), which base, in turn, carries a plurality of piercing members 106, for piercing the shingle-forming layer 107 to make a plurality of holes 101 that in a given collection 102 provide a mark, adapted for being sensed by a sensor 30 or the like, as described above, for accomplishing the shingle-completion steps described above. It will understood that the holes 101 may be of any desired size or shape, may pass entirely through the shingle-forming layer 107, or not, may take the form of notches or any other shapes, etc.

With reference now to FIG. 3, it will be seen that a shingle-forming layer 200 is shown, in which barcode(s) 201, identical or different from each other, as may be desired, are applied to the upper surface 202 of the shingle-forming layer 200, by means of a barcode printer or the like 203 applying the same onto a tape 204 applied to the upper surface of the shingle-forming layer 200. Alternatively, the barcode(s) may be applied directly to the upper surface of the shingle-forming layer, as may be desired. In a similar manner as described above, the barcode(s) may be read by a sensor such as that 30 or the like, for controlling the shingle-completion steps. Such barcodes can be at least one-dimensional in nature, or two-dimensional or more complex images, depending upon the complexity of the information necessary to control multiple actions and operations in the manufacture of the finished shingles.

With reference to FIG. 4 a shingle-forming layer 300 is shown, comprising a multi-layer formation, including an upper layer 301 and a lower layer 302, adhesively secured together to form a multi-layer shingle, after the shingle-forming layer 300 is severed into discrete shingles.

As with the embodiment shown in FIG. 1, the upper surface of the shingle-forming layer 300 is provided with a tape 303 having a plurality of marks 304 thereon for detection by a sensor such as that 30 or its functional equivalent, as described above, for controlling shingle-completion steps.

With reference now to FIG. 5, as distinguished from the even spacing-apart of the marks 304 as shown for the embodiment of FIG. 4, the marks 404 on the shingle-forming layer 400 of the embodiment of FIG. 5, are unevenly spaced apart to provide a predetermined non-repeatability of features of subsequent shingle-completion steps.

Figure 6:
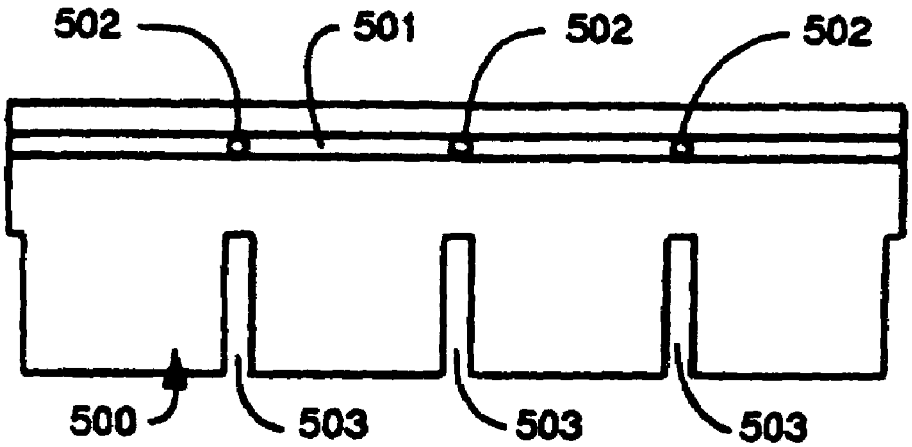
FIG. 6 is a top plan view of a shingle in accordance with this invention, wherein the marks appear on a tape that is applied to the shingle, and are synchronized above the placement of slots between adjacent tabs of the shingle.

In FIG. 6 a shingle 500 is shown, having a tape 501 on the upper surface, which tape 501 has a plurality of marks 502 thereon, with the marks 502 being spaced apart to define placement precisely aligned therewith for slots 503. The tape 501 is applied in a manner similar to that described above for the tape discussed with respect to FIG. 1, and the slots 503 are likewise controlled in their placement by a controller such as that 32 of FIG. 1 that, in turn, is actuated by means of a sensor such as that 30 of FIG. 1 sensing the marks 502.

Figure 7:
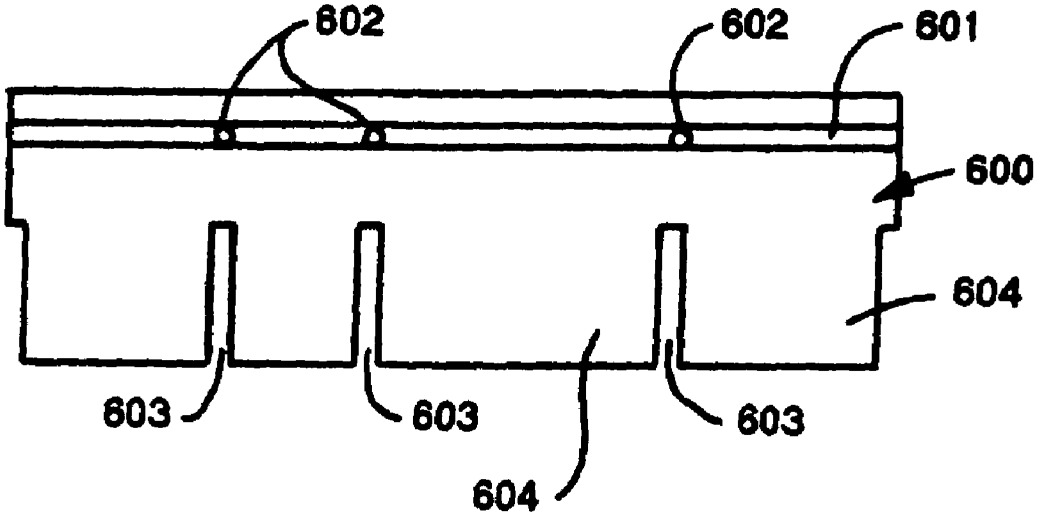
FIG. 7 is an illustration similar to that of FIG. 6, but wherein the marks and tab-separating slots are seemingly randomly located along the length of the shingle.

In FIG. 7 a shingle 600 is presented, having a tape 601 applied to an upper surface thereof, with irregularly spaced marks 602, that dictate via a sensor such as that 30 and controller such as that 32, the placement of slots 603 between adjacent tabs 604 of the shingle 600, to correspond to the placement of marks 602, in the longitudinal direction.

Figure 8:
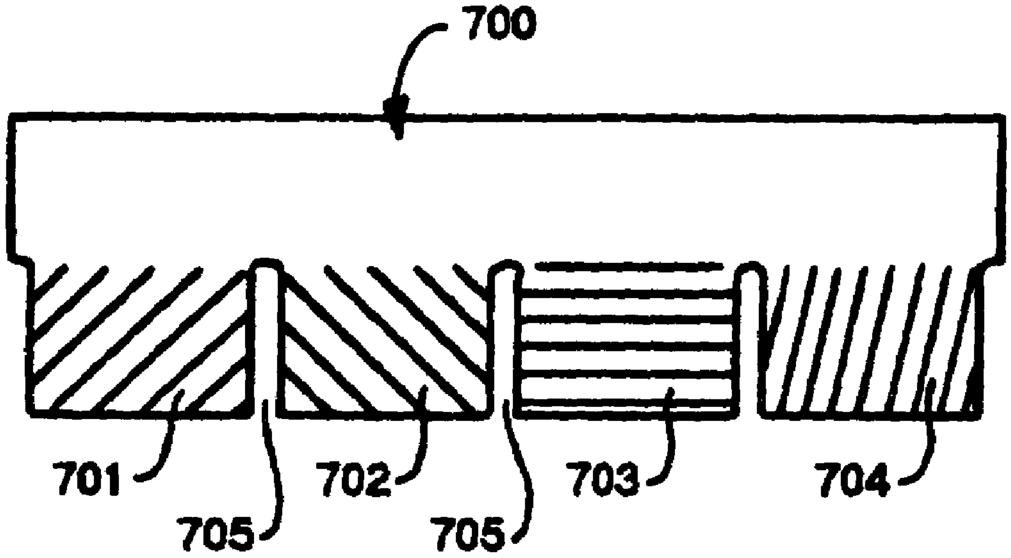
FIG. 8 is a top view of a shingle made in accordance with this invention, wherein four distinct decorative effects are shown in the tab regions of the shingle, with the tab regions being spaced apart by slots.

With reference now to FIG. 8, a shingle 700 is shown, having four tabs, each with its own decorative covering of granules thereon, each having its own aesthetic appearance.

The four different granule drops that produce the differently decorated tabs 701, 702, 703 and 704 are controlled in the manner described above with respect to FIG. 1. As was discussed above with respect to FIG. 1, any desired number of granule drop systems such as those 37 and 38 can be used. In the case of the shingle of FIG. 8, preferably four such systems are used to produce the different aesthetic presentations shown for the tab portions 701-704 of the shingle 700. Likewise, the precise placement of slots such as those 705 between adjacent tabs may be controlled in the manner described above with respect to FIG. 1. It will be understood that the shingle 700 of FIG. 8 could be an anterior layer of a multilayer shingle, where a posterior layer (not shown) may have portions visible between and/or extending below the lower edges of the tab portions 701-704.

It will be understood that where different decorative granule applications are applied to shingle tab areas, such as those shown in FIG. 8, those shown in FIG. 1, or those shown in the other figures of this application, any individual granule drop from its granule applicator may be comprised entirely of granules of a given color or size, or may be comprised of predetermined blends of granules of different colors and/or sizes, but that the different presentations for the different tabs, such as shown in FIG. 5 depict different visual appearances for the tabs.

Figure 9:
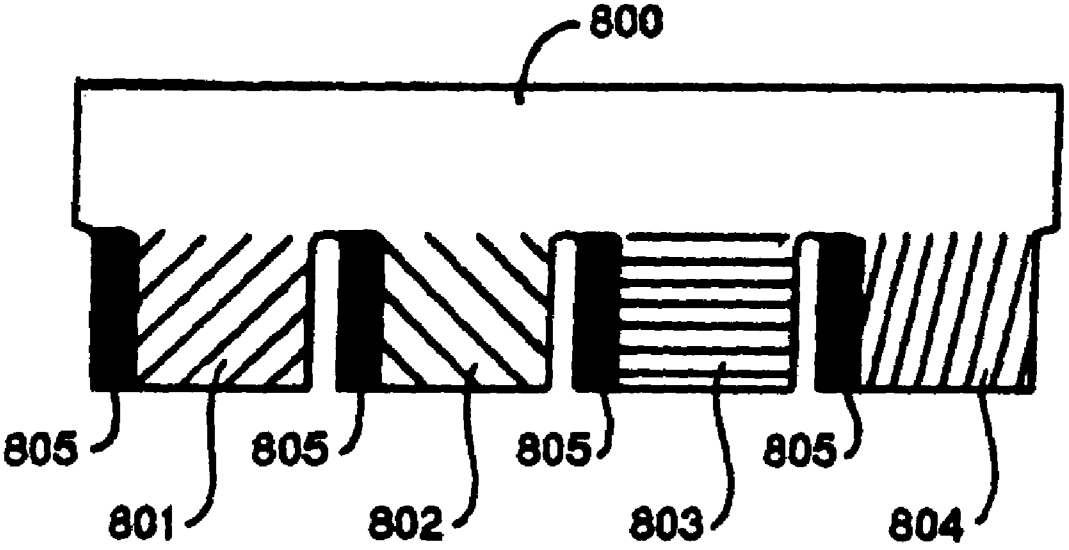
FIG. 9 is an illustration similar to that of FIG. 8, but wherein shade lines are illustrated adjacent the left edge of each tab of the shingle.

With reference to FIG. 9, a shingle 800 is illustrated having tabs 801, 802, 803 and 804, of different visual decorations, as described above with respect to FIG. 8, but in the case of the tabs of FIG. 9, shading areas 805 are shown on the left side of each tab, representing another visual decoration that may be applied by sensing marks and controlling the application of granules, for example, of darker selection, from a granule applicator, all as sensed and controlled in a manner such as is set forth above with respect to the description of FIG. 1.

Figure 10:
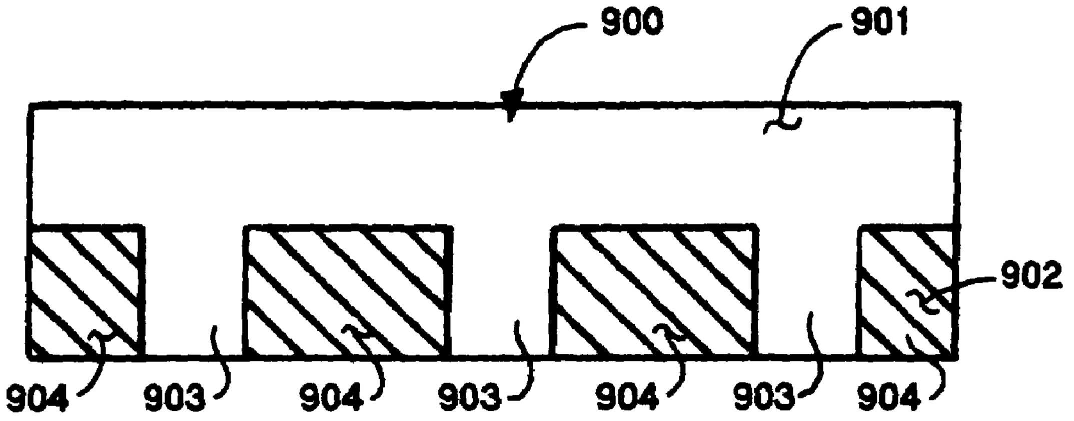
FIGS. 10, 11 and 12 are top plan views of different shingles made in accordance with this invention, wherein different aesthetic effects are realized.

With reference to FIG. 10, a multi-layer shingle 900 is shown, having an upper layer 901 and a lower layer 902. The upper layer has tabs 903 precisely spaced apart in a manner as controlled by a system such as that described above with respect to FIG. 1. However, in the illustration of FIG. 10, a shim provides the layer 902, either of full height or approximately half height, laminated behind the layer 901, and wherein decorative frontal or anterior surface portions 904 for the posterior layer 902 are visible between adjacent tabs 903 to provide a dragon's tooth effect. In the embodiment shown in FIG. 10, the visible portions 904 of the anterior surface of the posterior layer 902 are of the same decorative or aesthetic effect, but it will be understood that such could be of different aesthetic effects. It will also be apparent that the control of placement of the decorative granules on the posterior layer 902 can be as controlled in the manner described above with respect to the various mechanisms of FIG. 1.

Figure 11:
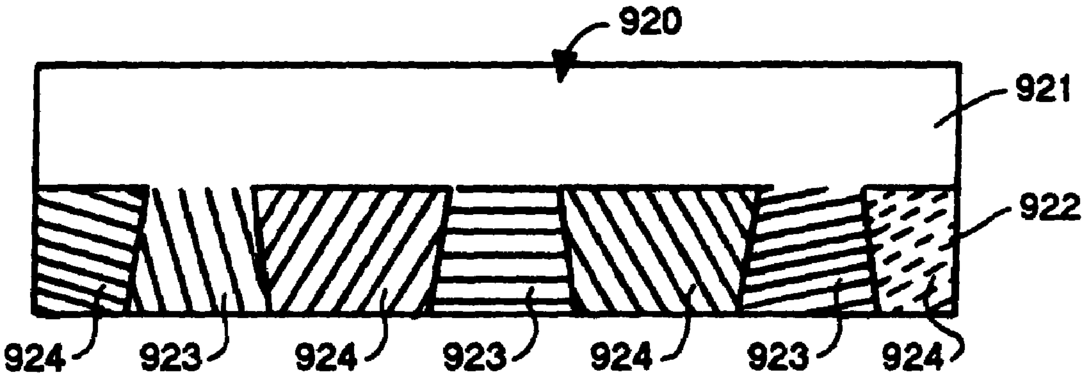

With reference now to FIG. 11, a shingle 920 is illustrated as having an upper or anterior shingle layer 921 and a lower or posterior shingle layer 922 adhesively secured thereto to make a laminated two-piece shingle. The shingle 920 is also of the dragon's tooth type, wherein spaced apart tabs 923 have angled right and left edges and have spaces therebetween as determined by the slot or space making technique as described above with respect to FIG. 1 are made, and with the spaces between the tabs 923 showing anterior surface portions of posterior layer 922 therethrough, as shim zones 924. It will be noted that each of the shim zones 924 and each of the tabs 923 have different decorative configurations, either by having different colored and/or sized granules thereon, or by having different mixes of various colored granules and/or granule sizes thereon, but wherein each tab and each shim zone presents a different aesthetic variation. It will be understood that the various decorative tab areas and shim areas as shown in FIG. 11 may have their placements precisely controlled in accordance with the method described above with respect to FIG. 1.

Figure 12:
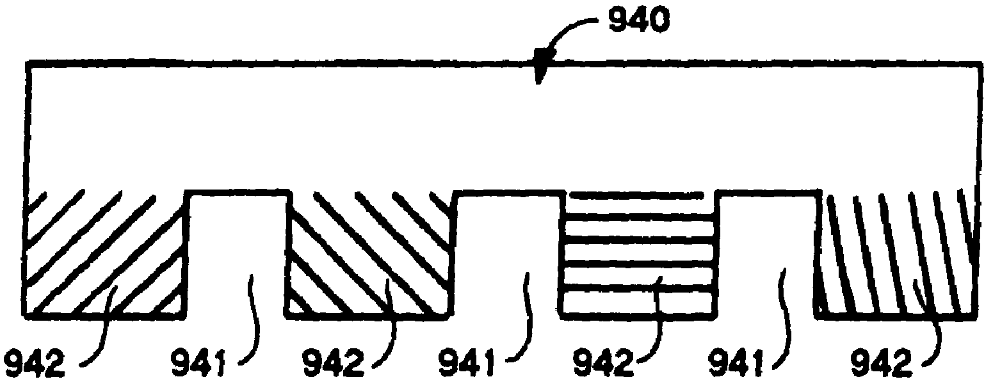

With respect to FIG. 12, a shingle 940 is illustrated, of the single layer type, in which the spaces 941 between adjacent tabs 942 are more widely spaced apart than the slots, for example for the shingles illustrated in any of FIGS. 6-9, to yield a dragon's tooth effect, and wherein the anterior surfaces of the tabs 942 each have some decorative variation from the other tabs, which variations can be in different colors or sizes of granules, different blends of colors or sizes of granules, or the like, all as may be desired.

Figure 13B:
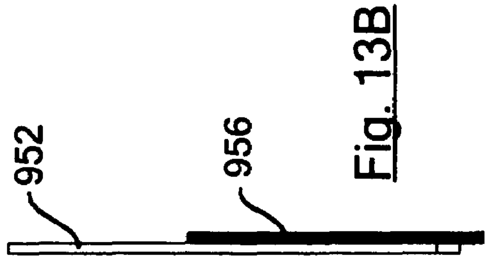
FIGS. 13, 13A and 13B represent a multi-layer shingle (FIG. 13) wherein a full backing or posterior layer is shown in FIG. 13A, and wherein a partial backing or posterior layer is shown in FIG. 13B
Figure 13A:
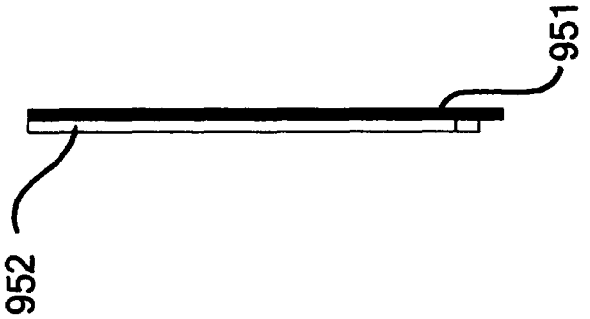
Figure 13:
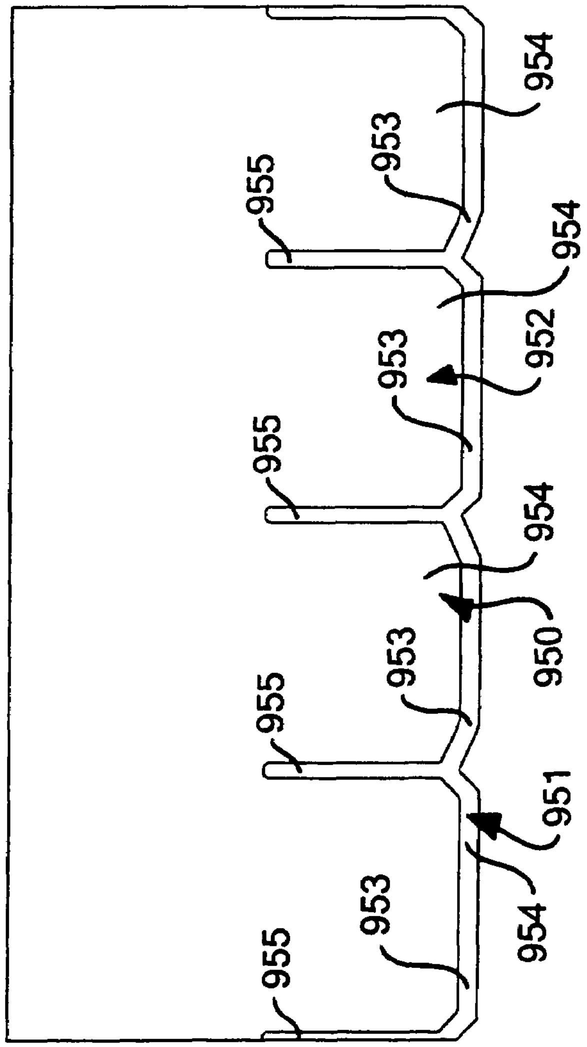

In FIG. 13, the anterior layer 950 and posterior layer 951 for the shingle 952 are shown, with the posterior layer portions 953 and 954 providing a petticoat effect 953 beneath anterior tabs 954 and visible posterior portions 955 between anterior tabs 954, respectively. FIG. 13A shows a full height backing or posterior layer 951 behind anterior layer 952 and FIG. 13B shows a partial height backing or posterior layer 956 behind anterior layer 952, each with a petticoat portion 953 and visible portions 955 as discussed above. The tabs 954 could be different in color or shading, in whole or in part, as may be desired.

It will be understood from the above that many variations can be made in the shingles that are made in accordance with the process of this invention, and that variations can be made in the processes as well. For example, the marks that are made on a tape may be in the shape of a square or rectangle, and that the tape may be a film or other thin substrate attached or adhered to the shingle-forming layer. The marks can be printed on either or both sides, for example of a clear substrate, and the substrate may be comprised of paper, parchment, or films commonly used in the roofing industry and applied to roofing shingles or rolls. Such tapes can be, but are not limited to, those of polyester, nylon, polypropylene or the like, and may be metalized or comprise combinations of layered film types to add integrity or heat resistance. To add resistance where tension can be a concern, a reinforced film substrate with reinforcement strands in the longitudinal or machine direction may, if desired, be included as components of the tape.

The marks can be magnetic in nature, if desired, can have color contrast, can be radioactive, or can be otherwise measurable or distinctive, to be detected by a sensor having a means for detection of such marks.

The shingle-forming layer can be, if desired, of a contrasting color relative to the marks, such as dark in the case of a light mark, or light in the case of a dark mark, or can be metalized or clear in nature, such that dark asphalt showing through a clear tape can give contrast to a lighter colored mark. It will also be clear that the marks, whether applied by means of a tape or the like, or not, can be applied to either the top or bottom side of a shingle-forming layer, as may be desired, and that the marks can be of various shapes, widths and lengths as may be required by a desired sensor. If the mark is applied to a tape or the like, such tape could also function as a release film, in that release films are commonly used in the roofing industry to be applied against an adhesive strip, in bundling of shingles, to keep adjacent bundled shingles from sticking together, but which will facilitate their separation when installed on a roof. The tape could also be light colored in nature when applied over a darker shingle-forming layer, and in instances in which the mark is in the form of perforations in such a tape, the darker color showing through the tape could be the mark that is detectable by a sensor. It will also be apparent that in accordance with this invention, shingles having no tabs may be enhanced by having in their tab regions which comprise the lower portion of the shingle as it is installed on a roof, different decorative presentations adjacent each other, precisely applied in accordance with the features of the present invention, yet wherein no slots or spaces are formed in the tab regions and consequently no distinct tabs as such are presented.

It will thus be apparent from the foregoing that various modifications may be made in the details of shingle construction, as well as in the method of making such shingles, all within the spirit and scope of the invention as defined in the appended claims.

What is claimed is:

1. A method of making a shingle in a manufacturing environment, in which the shingle has a butt region and a tab region with the tab region having decorative granules applied thereto, the method comprising:

(a) providing a shingle-forming layer comprised of shingle reinforcement material impregnated with a bitumen material, the layer having a butt region and a tab region, and including the step of delivering the layer along a longitudinal path;

(b) optionally, providing a layer of headlap granules on an upper surface of at least the butt region of the shingle-forming layer;

(c) applying a plurality of marks to the shingle-forming layer, with the marks being provided at predetermined longitudinally spaced-apart distances from each other and being applied independently of and synchronized to control the timing and placement of features of subsequent shingle-completion steps; and (d) sensing the locations of the marks and then actuating any of the following subsequent shingle-completion steps as a function of the placement of the marks on the shingle-forming layer:

(i) controlling the humidity of the shingle manufacturing environment, for controlling expansion and contraction of at least portions of the shingle being manufactured;

(ii) controlling the discharge of decorative granules from a granule applicator; and (iii) controlling the relative positions of at least one granule applicator and the shingle-forming layer.

2. The method of claim 1, wherein the step of applying a plurality of marks to the shingle-forming layer occurs prior to application of decorative granules to the tab region of the shingle-forming layer.

3. The method of any one of claims 1-2, wherein the marks comprise high visual contrast areas relative to the shingle-forming layer to which they are applied.

4. The method of any one of claims 1-2, wherein the marks comprise coded holes applied to the shingle-forming layer.

5. The method of claim 1, wherein the shingle-completion step is application of decorative granules in the tab region of the shingle-forming layer.

6. The method of claim 1, wherein in the marks are evenly spaced apart from each other, to provide a predetermined repeatability of features of the subsequent shingle-completion steps.

7. The method of claim 1, wherein in the marks are unevenly spaced apart from each other, to provide a predetermined non-repeatability of features of the subsequent shingle-completion steps.

8. The method of claim 1, wherein the marks are applied to a tape that is adhesively applied to the shingle-forming layer.

9. The method of claim 8, wherein the marks are comprised of darkened portions of the tape.

10. The method of claim 8, wherein the marks comprise barcode(s).

11. The method of claim 1, wherein the tape is a release tape.

12. The method of claim 11, wherein the release tape is removable from the shingle.

13. The method of claim 1, wherein the marks comprise barcode(s).

14. The method of claim 1, wherein the marks are applied to a tape before the tape is applied to a shingle-forming layer.

15. The method of claim 1, wherein the marks are applied to a tape after the tape is applied to a shingle-forming layer.

16. The method of claim 1, wherein the shingle completion step comprises controlling the humidity of the shingle manufacturing environment for controlling expansion and contraction of at least portions of the shingle being manufactured.

17. The method of claim 1, wherein the shingle completion step comprises controlling the discharge of decorative granules from a granule applicator.

18. The method of claim 1, wherein the shingle completion step comprises controlling the longitudinal position of at least one granule applicator.

19. A method of making a shingle in a manufacturing environment, in which the shingle has a butt region and a tab region with the tab region having decorative granules applied thereto, the method comprising:

(a) providing a shingle-forming layer comprised of shingle reinforcement material impregnated with a bitumen material, the layer having a butt region and a tab region, and including the step of delivering the layer along a longitudinal path;

(b) optionally, providing a layer of headlap granules on an upper surface of at least the butt region of the shingle-forming layer;

(c) the shingle-forming layer having sensible portions thereof, which, when sensed, can be used to control the timing and placement of features of subsequent shingle-completion steps; and (d) sensing the locations of the sensible portions of clause (c) and then actuating any of the following subsequent shingle-completion steps as a function of the sensed shingle portions of the shingle-forming layer:

(i) controlling the humidity of the shingle manufacturing environment, for controlling expansion and contraction of at least portions of the shingle being manufactured;

(ii) controlling the discharge of decorative granules from a granule applicator; and (iii) controlling the relative positions of at least one granule applicator and shingle-forming layer.

20. The method of claim 19, wherein the shingle completion step comprises controlling the humidity of the shingle manufacturing environment for controlling expansion and contraction of at least portions of the shingle being manufactured.

21. The method of claim 19, wherein the shingle completion step comprises controlling the discharge of decorative granules from a granule applicator.

22. The method of claim 19, wherein the shingle completion step comprises controlling the longitudinal position of at least one granule applicator.

* * * * *

UNITED STATES PATENT AND TRADEMARK OFFICE

CERTIFICATE OF CORRECTION

PATENT NO. : 7,510,622 B2
APPLICATION NO. : 10/544567
DATED : March 31, 2009
INVENTOR(S) : Husnu M. Kalkanoglu et al.

It is certified that error appears in the above-identified patent and that said Letters Patent is hereby corrected as shown below:

Column 11 claim 11, "claim 1" should read -- claim 8 --

Signed and Sealed this

Twenty-first Day of December, 2010

David J. Kappos

*Director of the United States Patent and Trademark Office*